United States Patent
Peng (10) Patent No.: US 12,482,169 B2
(45) Date of Patent: Nov. 25, 2025

(54) METHOD, APPARATUSES AND SYSTEM FOR PRESENTING A TARGET, AND A STORAGE MEDIUM AND A PROGRAM PRODUCT

(71) Applicant: Siemens Healthcare GmbH, Erlangen (DE)

(72) Inventor: Xi Shuai Peng, Shanghai (CN)

(73) Assignee: Siemens Healthineers AG, Forchheim (DE)

(*) Notice: Subject to any disclaimer, the term of this patent is extended or adjusted under 35 U.S.C. 154(b) by 161 days.

(21) Appl. No.: 18/377,846

(22) Filed: Oct. 9, 2023

(65) Prior Publication Data
US 2024/0119659 A1   Apr. 11, 2024

(30) Foreign Application Priority Data
Oct. 9, 2022 (CN) .......................... 202211224864.2

(51) Int. Cl.
G06T 15/20 (2011.01)
A61B 6/00 (2024.01)

(52) U.S. Cl.
CPC .............. G06T 15/20 (2013.01); A61B 6/488 (2013.01); *G06T 2210/41* (2013.01)

(58) Field of Classification Search
CPC ......... A61B 6/466; A61B 6/488; A61B 6/542; G06T 15/20; G06T 2210/41; G06T 2210/56; G06T 2215/16
See application file for complete search history.

(56) References Cited

U.S. PATENT DOCUMENTS

| | | | |
|---|---|---|---|
| 11,113,875 B1* | 9/2021 | Monaghan | G06T 11/206 |
| 2017/0100089 A1* | 4/2017 | Chang | A61B 6/0492 |
| 2018/0296178 A1* | 10/2018 | Chang | G06T 7/73 |
| 2022/0101048 A1* | 3/2022 | Tan | G16H 50/20 |

* cited by examiner

*Primary Examiner* — Robin J Mishler
(74) *Attorney, Agent, or Firm* — Banner & Witcoff, Ltd.

(57) ABSTRACT

Techniques are provided for presenting a target in X-ray imaging. The techniques include acquiring N 3D images of an imaging target, with each 3D image being provided with a respective camera coordinate system and N being a positive integer greater than or equal to 2. The techniques also include generating a virtual 3D image on the basis of the N 3D images, with a camera coordinate system of the virtual 3D image taking an X-ray source as the origin, and converting the virtual 3D image into a 2D image. Finally, the technique includes presenting the 2D image. By means of the 2D image, the X-ray imaging target may be fully observed. In addition, distortion, such as warping or deformation, is not present in an imaging region and an automatic exposure region.

9 Claims, 6 Drawing Sheets

METHOD, APPARATUSES AND SYSTEM FOR PRESENTING A TARGET, AND A STORAGE MEDIUM AND A PROGRAM PRODUCT

CROSS-REFERENCE TO RELATED APPLICATIONS

The present application claims priority to and the benefit of China patent application no. CN 202211224864.2, filed on Oct. 9, 2022, the contents of which are incorporated herein by reference in their entirety.

TECHNICAL FIELD

The present disclosure relates to medical imaging and, in particular, to a method, apparatuses, and system for presenting a target in X-ray imaging as well as a storage medium and a computer program product.

BACKGROUND

X-rays are electromagnetic radiation with a wavelength between ultraviolet rays and gamma rays. X-rays are penetrating, having different penetrating abilities for substances of different densities. In medical settings, X-rays are generally projected onto organs and bones of the human body to form medical images. An X-ray imaging system generally comprises an X-ray generating component, a Bucky Wall Stand (BWS) component, an examination table component, a cassette component comprising a plate detector, and a control computer located remotely, etc. The X-ray generating component uses a high voltage provided by a high-voltage generator to emit X-rays which pass through an irradiated imaging target, and forms medical image information of the imaging target on the plate detector. The plate detector sends the medical image information to the control computer. The imaging target can stand close to the Bucky wall stand component or lie on the examination table component, so as to separately undergo X-ray photography of parts such as the head, chest, abdomen, and joints.

At present, a single camera component arranged on an X-ray generating component (such as a tube cover or beam limiter housing) has already been introduced into an X-ray imaging system. The single camera component photographs the imaging target (such as a subject) by a visible-light imaging means, and the image obtained by photography allows a technician to observe the imaging target. However, restricted by the arrangement position of a single camera component, the field of view of the image is limited, and it is difficult for the technician to fully observe the imaging target.

SUMMARY

Embodiments of the present disclosure propose a method, apparatuses, and system for presenting a target in X-ray imaging, as well as a storage medium and a computer program product.

The technical solutions of embodiments of the present disclosure comprise:

A method for presenting a target in X-ray imaging, the method comprising:
  acquiring N 3D images of an imaging target, wherein each 3D image is provided with a respective camera coordinate system, and N is a positive integer greater than or equal to 2;
  generating a virtual 3D image on the basis of the N 3D images, wherein a camera coordinate system of the virtual 3D image takes an X-ray source as the origin;
  converting the virtual 3D image into a 2D image; and
  presenting the 2D image.

It can be seen that embodiments of the present disclosure use a plurality of 3D images having respective camera coordinate systems to generate a virtual 3D image in a camera coordinate system which takes an X-ray source as the origin, which overcomes the defect that the restriction of the arrangement position of a single camera component causes the field of view of an image to be limited, and the 2D image of embodiments of the present disclosure may provide a more complete imaging target.

In a demonstrative embodiment, the method further comprises:
  receiving an X-ray imaging region;
  determining a coordinate range, of the virtual 3D image, corresponding to the X-ray imaging region;
  on the basis of the coordinate range, determining a first accentuation region for accentuating the X-ray imaging region in the 2D image; and
  presenting the first accentuation region in the 2D image.

Therefore, presenting the first accentuation region for accentuating the X-ray imaging region in the 2D image of the camera coordinate system which takes the X-ray source as the origin overcomes the problem of coordinate systems mismatching, and thereby overcomes the defect of distortion of the first accentuation region.

In a demonstrative embodiment, the method further comprises:
  determining an automatic exposure region on the basis of a detector type;
  determining a coordinate range, of the virtual 3D image, corresponding to the automatic exposure region;
  on the basis of the coordinate range, determining a second accentuation region for accentuating the automatic exposure region in the 2D image; and
  presenting the second accentuation region in the 2D image.

It can be seen that presenting the second accentuation region for accentuating the automatic exposure region in the 2D image of the camera coordinate system which takes the X-ray source as the origin overcomes the problem of coordinate systems mismatching, and thereby overcomes the defect of distortion of the second accentuation region.

In a demonstrative embodiment, the generation of a virtual 3D image on the basis of the N 3D images comprises:
  respectively converting the N 3D images into point-cloud images in respective camera coordinate systems to obtain N point-cloud images; and
  fusing the N point-cloud images into a point-cloud image representing the virtual 3D image in a camera coordinate system which takes the X-ray source as the origin.

Therefore, embodiments of the present disclosure may conveniently generate a virtual 3D image by means of point-cloud image conversion processing.

In a demonstrative embodiment, the conversion of the virtual 3D image into a 2D image comprises:
  receiving a set instruction including a focal length value and a resolution value;
  obtaining the focal length value and the resolution value from the set instruction by parsing; and
  on the basis of the focal length value and the resolution value, mapping a point-cloud image of the virtual 3D image into a 2D image.

Therefore, embodiments of the present disclosure may conveniently generate a 2D image by means of receiving camera internal parameters including a focal length value and a resolution value.

An apparatus for presenting a target in X-ray imaging, the apparatus comprising:
- an acquisition module, which is used for acquiring N 3D images of an imaging target, wherein each 3D image is provided with a respective camera coordinate system, and N is a positive integer greater than or equal to 2;
- a generation module, which is used for generating a virtual 3D image on the basis of the N 3D images, wherein a camera coordinate system of the virtual 3D image takes an X-ray source as the origin;
- a conversion module, which is used for converting the virtual 3D image into a 2D image; and
- a presentation module, which is used for presenting the 2D image.

It can be seen that embodiments of the present disclosure use a plurality of 3D images having respective camera coordinate systems to generate a virtual 3D image in the camera coordinate system which takes the X-ray source as the origin, which overcomes the defect that the restriction of the arrangement position of a single camera component causes the field of view of an image to be limited, and the 2D image of embodiments of the present disclosure may provide a more complete imaging target.

In a demonstrative embodiment, the presentation module is used for receiving an X-ray imaging region; determining a coordinate range, of the virtual 3D image, corresponding to the X-ray imaging region; on the basis of the coordinate range, determining a first accentuation region for accentuating the X-ray imaging region in the 2D image; and presenting the first accentuation region in the 2D image.

Therefore, presenting the first accentuation region for accentuating the X-ray imaging region, in the 2D image of the camera coordinate system which takes the X-ray source as the origin overcomes the problem of coordinate systems mismatching and thereby overcomes the defect of distortion of the first accentuation region.

In a demonstrative embodiment, the presentation module is used for determining an automatic exposure region on the basis of a detector type; determining a coordinate range, of the virtual 3D image, corresponding to the automatic exposure region; on the basis of the coordinate range, determining a second accentuation region for accentuating the automatic exposure region in the 2D image; and presenting the second accentuation region in the 2D image.

It can be seen that presenting the second accentuation region for accentuating the automatic exposure region, in the 2D image of the camera coordinate system which takes the X-ray source as the origin overcomes the problem of coordinate systems mismatching and thereby overcomes the defect of distortion of the second accentuation region.

In a demonstrative embodiment, the generation module is used for respectively converting the N 3D images into point-cloud images in respective camera coordinate systems to obtain N point-cloud images; fusing the N point-cloud images into a point-cloud image representing the virtual 3D image in a camera coordinate system which takes the X-ray source as the origin.

Therefore, embodiments of the present disclosure may conveniently generate a virtual 3D image by means of point-cloud image conversion processing.

In a demonstrative embodiment, the conversion module is used for receiving a set instruction including a focal length value and a resolution value; obtaining the focal length value and the resolution value from the set instruction by parsing; and on the basis of the focal length value and the resolution value, mapping a point-cloud image of the virtual 3D image into a 2D image.

Therefore, embodiments of the present disclosure may conveniently generate a 2D image by means of receiving camera internal parameters including a focal length value and a resolution value.

A system for presenting a target in X-ray imaging, the system comprising:
- N camera components, which are used for acquiring N 3D images of an imaging target, wherein each 3D image is provided with a respective camera coordinate system, and N is a positive integer greater than or equal to 2; and
- a control module, which is used for generating a virtual 3D image on the basis of the N 3D images, wherein a camera coordinate system of the virtual 3D image takes an X-ray source as the origin; converting the virtual 3D image into a 2D image; and presenting the 2D image.

It can be seen that embodiments of the present disclosure use a plurality of 3D images having respective camera coordinate systems to generate a virtual 3D image in the camera coordinate system which takes the X-ray source as the origin, which overcomes the defect that the restriction of the arrangement position of a single camera component causes the field of view of an image to be limited, and the 2D image of embodiments of the present disclosure may provide a more complete imaging target.

In a demonstrative embodiment, the N camera components are arranged at respective mounting positions on an X-ray generating component.

Therefore, by means of arranging N camera components at respective mounting positions on an X-ray generating component, N 3D images having respective camera coordinate systems may be conveniently acquired.

An apparatus for presenting a target in X-ray imaging, the apparatus comprising a processor and a memory, wherein an application program executable by the processor is stored in the memory, and is used for causing the processor to execute the method for presenting a target in X-ray imaging as described in any one of the embodiments above.

A computer-readable storage medium, wherein a computer-readable instruction is stored therein and, when the computer-readable instruction is executed by a processor, the method for presenting a target in X-ray imaging as described in any one of the embodiments above is implemented.

A computer program product comprising a computer program, wherein, when the computer program is executed by a processor, the method for presenting a target in X-ray imaging as described in any one of the embodiments above is implemented.

The reference labels are as follows:

| | |
|---|---|
| 200 | Method for presenting a target in X-ray imaging |
| 201-204 | Blocks |
| 10 | Image of a hand |
| 11 | X-ray imaging region |
| 12 | Automatic exposure region |
| 20 | X-ray tube |
| 21, 22, 23, 24 | Camera components |
| 31 | First 3D image |
| 32 | Second 3D image |
| 33 | First point-cloud conversion processing |
| 34 | Second point-cloud conversion processing |
| 40 | X-ray tube |
| 41 | First camera component |
| 42 | Second camera component |
| 43 | Virtual camera component |
| 35 | 2D image |
| 36 | Second accentuation region |
| 37 | First accentuation region |
| 500 | Apparatus for presenting a target in X-ray imaging |
| 501 | Acquisition module |
| 502 | Generation module |
| 503 | Conversion module |
| 504 | Presentation module |
| 600 | Apparatus for presenting a target in X-ray imaging |
| 601 | Processor |
| 602 | Memory |

DETAILED DESCRIPTION OF THE DISCLOSURE

The present disclosure is explained in further detail below in conjunction with the accompanying drawings and embodiments to clarify the technical solutions and advantages thereof. It should be understood that the particular embodiments described here are provides as examples and intended to explain the present disclosure elaboratively, and not to limit the scope of protection thereof.

Conventionally, a single camera component (such as a 3D camera) is generally arranged at a fixed position on a housing (such as a tube cover or beam limiter housing) of an X-ray generating component. The single camera component photographs an imaging target (such as a subject) by a visible-light imaging means so as to acquire a single image including the imaging target for a technician to observe the imaging target.

The applicant has discovered that since the single camera component is arranged at a fixed position on the housing, the field of view of the single image is fixed and limited, such that it is difficult for the technician to observe the complete imaging target. In addition, in numerous algorithms for post-processing (such as demarcating an imaging region or automatic exposure region in an image) of an image captured by a camera component, the default coordinate system used in the algorithms is generally a tube coordinate system, which is inconsistent with a camera coordinate system (which takes the optical center of a camera component as the origin) of the captured image, thus causing distortion in post-processing results.

Figure 1:
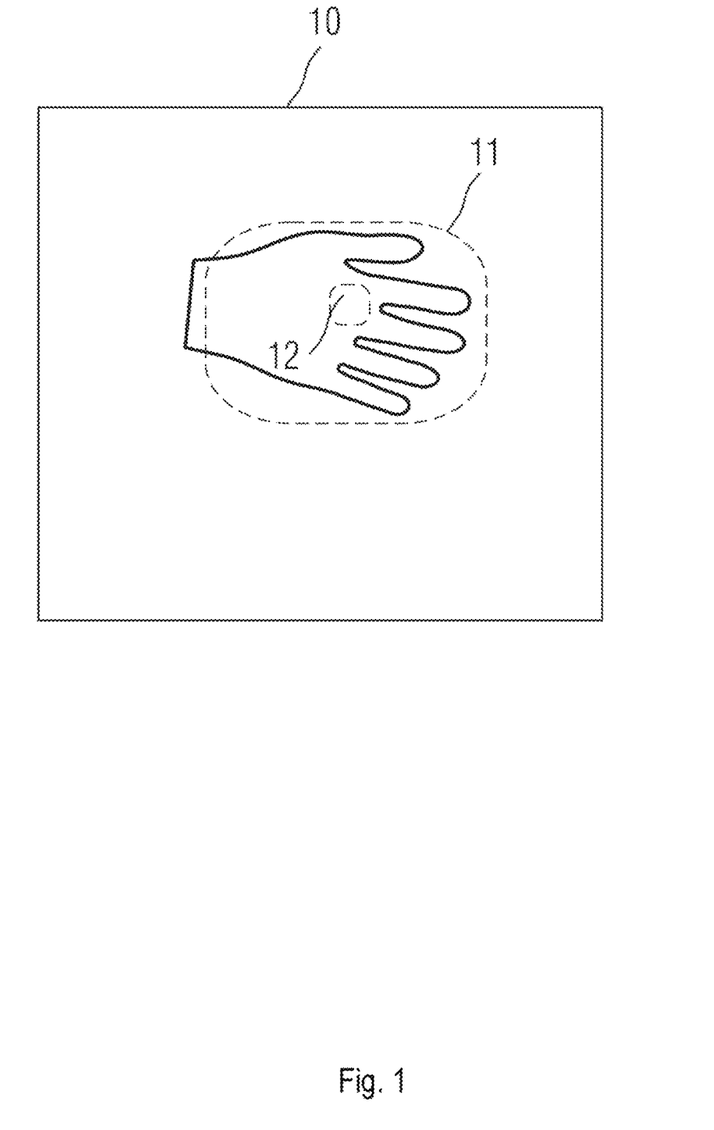
FIG. 1 illustrates a conventional schematic diagram of an X-ray imaging range and automatic exposure region for presenting an imaging target.

FIG. 1 illustrates a conventional schematic diagram of an X-ray imaging range and automatic exposure region for presenting an imaging target. The image 10 of a hand is obtained by photographing the hand using a single camera component arranged on the X-ray generating component. The camera coordinate system of the image 10 takes the optical center of the camera component as the origin. However, in the algorithm for demarcating an imaging region or automatic exposure region in the image, the default coordinate system used is a tube coordinate system (with coordinates of the X-ray source in the X-ray generating component being the origin). This problem of mismatch with the camera coordinate system results in both the demarcated imaging region 11 and automatic exposure region 12 not being the set rectangles in the algorithm, with distortion such as warping or deformation present, thus causing complications for a user.

Embodiments of the present disclosure propose techniques for presenting a target in X-ray imaging. A plurality of 3D images having respective camera coordinate systems are used to generate a virtual 3D image in a camera coordinate system which takes an X-ray source as the origin, which overcomes the defect that the restriction of the arrangement position of a single camera component causes the field of view of an image to be limited.

In addition, since executing a demarcating algorithm for an imaging region or an automatic exposure region in a 2D image converted from a virtual 3D image overcomes the defect of mismatch between the image and the default coordinate system of the algorithm, distortion is no longer present in the imaging region and automatic exposure region.

Figure 2:
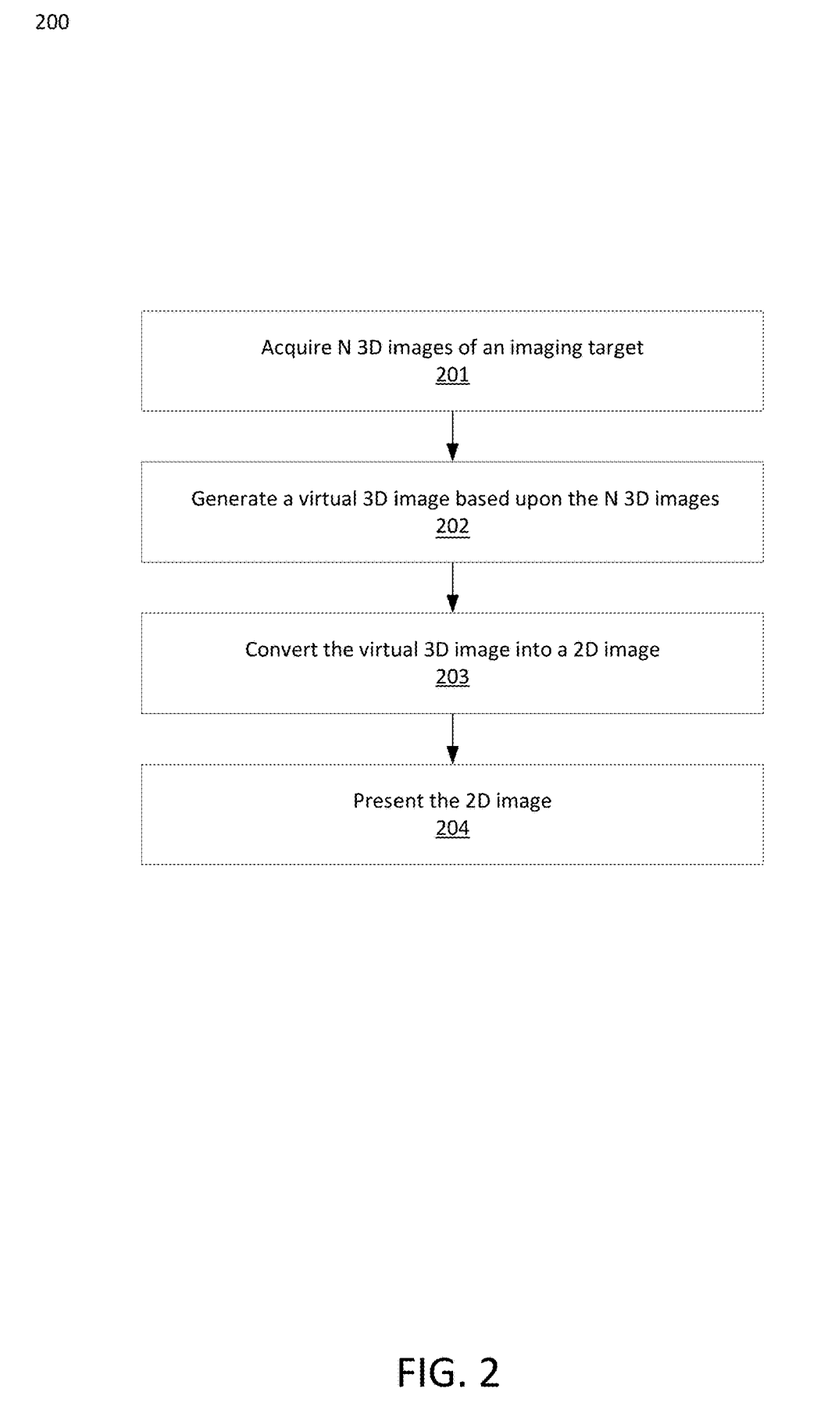
FIG. 2 illustrates an example flow chart of a method for presenting a target in X-ray imaging according to one or more embodiments of the present disclosure.

FIG. 2 illustrates an example flow chart of a method for presenting a target in X-ray imaging according to one or more embodiments of the present disclosure;

The method shown in FIG. 2 may be performed by a controller. The controller may be implemented as a control computer integrated in an X-ray imaging system or may be implemented as a control unit that is independent of such a control computer.

As shown in FIG. 2, the method 200 comprises:

Block 201: acquiring N 3D images of an imaging target, wherein each 3D image is provided with a respective camera coordinate system, and N is a positive integer greater than or equal to 2.

The imaging target is a target which needs to be subjected to X-ray photography. The imaging target may be an organism or a lifeless body, and embodiments of the present disclosure have no limit with regard to the specific characteristics of the imaging target.

Here, N camera components may be used respectively to photograph the imaging target to obtain respective 3D images, so as to obtain N 3D images, wherein each camera component is respectively arranged at a different position on the X-ray generating component, and each 3D image is provided with a respective camera coordinate system. In the camera coordinate system of each 3D image, the optical center of the respective camera component which obtains the 3D image by photography is the origin, and therefore the camera coordinate systems of the 3D images are different to each other (correspondingly, the angles of view of the photographed imaging targets are also different). Each of the N camera components is respectively fixed at a different arrangement position on a tube cover or beam limiter housing of the X-ray generating component. For example, N recesses for accommodating the respective camera components are arranged on the tube cover or the beam limiter housing, and each camera component is fixed in the respective recess by bolt connection, snap-fit connection, a steel wire loop, etc.

In one embodiment, each camera component comprises at least one 3D camera. The 3D camera uses 3D imaging technology to photograph and obtain a 3D image of the imaging target. In one embodiment, each camera component comprises at least two 2D cameras, each of which is separately arranged at a different predetermined position in the same recess. In practice, those skilled in the art can select a suitable position as the predetermined position to arrange the 2D camera as required. The camera component may further comprise an image processor. An image processor synthesizes the 2D images captured by the 2D cameras into a 3D image of the imaging target, wherein the depth of field used by the image processor during synthesis may be the depth of field of any 2D image. Optionally, each 2D camera may send a respectively captured 2D image to an image processor outside the camera component for the image processor outside the camera component to synthesize a 3D image of the imaging target from the 2D images captured by the 2D cameras, wherein the depth of field used by the image processor outside the camera component during synthesis may likewise be the depth of field of any 2D image. Specifically, the image processor outside the camera component may be implemented as a control computer in the X-ray imaging system or as an independent control unit separate from the X-ray imaging system.

In one embodiment, each camera component may comprise: at least one 2D camera and at least one depth of field sensor. The at least one 2D camera and the at least one depth of field sensor may be installed at the same position in the same recess. Each camera component may further comprise an image processor. The image processor uses a depth of field provided by the depth of field sensor and a 2D photograph provided by the 2D camera together to generate a 3D image of the imaging target. Optionally, the 2D camera sends a captured 2D image of the imaging target to an image processor outside the camera component, and the depth of field sensor sends an acquired depth of field to the image processor outside the camera component, for the image processor outside the camera component to use the depth of field and the 2D photograph together to generate a 3D image of the imaging target. In an embodiment, the image processor outside the camera component may be implemented as a control computer in the X-ray imaging system, or as an independent control unit separate from the X-ray imaging system.

Typical examples of the camera component photographing the imaging target to generate a 3D image have been described demonstratively above, but those skilled in the art will realize that such descriptions are provided by way of example and are demonstrative, and not intended to limit the scope of protection of the embodiments of the present disclosure.

Figure 3A:
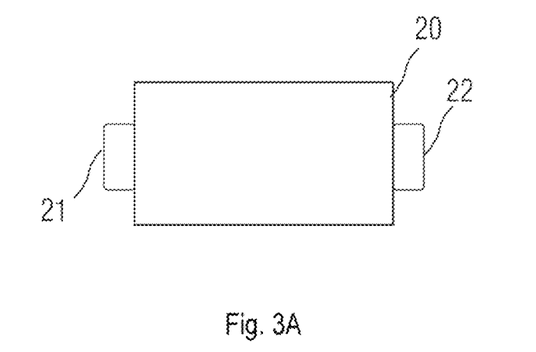
FIG. 3A illustrates a first example schematic diagram for arranging camera components according to one or more embodiments of the present disclosure.

FIG. 3A illustrates a first example schematic diagram for arranging camera components according to one or more embodiments of the present disclosure. In FIG. 3A, the first camera component 21 and the second camera component 22 are arranged on the X-ray tube 20, wherein the first camera component 21 and the second camera component 22 are respectively arranged at two opposite sides of the X-ray tube 20 in a horizontal direction. Therefore, the first camera component 21 photographs the imaging target to obtain a 3D image of the imaging target viewed from one side of the X-ray tube 20 in the horizontal direction, and the second camera component 22 photographs the imaging target to obtain a 3D image of the imaging target viewed from the side opposite the first camera component 21 in the horizontal direction of the X-ray tube 20.

Figure 3B:
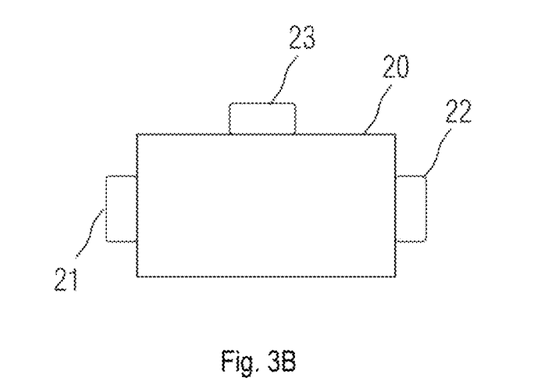
FIG. 3B illustrates a second example schematic diagram for arranging camera components according to one or more embodiments of the present disclosure.

FIG. 3B illustrates a second example schematic diagram for arranging camera components according to one or more embodiments of the present disclosure. In FIG. 3B, the first camera component 21, the second camera component 22, and the third camera component 23 are arranged on the X-ray tube 20, wherein the first camera component 21 and the second camera component 22 are respectively arranged at two opposite sides of the X-ray generating component in a horizontal direction, and the third camera component 23 is arranged at one side of the X-ray tube 20 in the vertical direction. Therefore, the first camera component 21 photographs the imaging target to obtain a 3D image of the imaging target viewed from one side of the X-ray tube 20 in the horizontal direction, and the second camera component 22 photographs the imaging target to obtain a 3D image of the imaging target viewed from the side opposite the first camera component 21 in the horizontal direction of the X-ray tube 20. The third camera component 23 photographs the imaging target to obtain a 3D image of the imaging target viewed from one side of the X-ray tube 20 in the vertical direction.

Figure 3C:
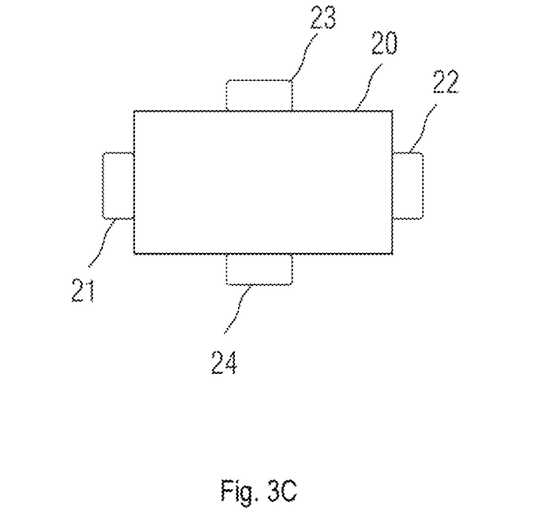
FIG. 3C illustrates a third example schematic diagram for arranging camera components according to one or more embodiments of the present disclosure.

FIG. 3C illustrates a third example schematic diagram for arranging camera components according to one or more embodiments of the present disclosure. In FIG. 3C, the first camera component 21, the second camera component 22, the third camera component 23, and the fourth camera component 24 are arranged on the X-ray tube 20, wherein the first camera component 21 and the second camera component 22 are respectively arranged at two opposite sides of the X-ray tube 20 (e.g. an X-ray generating component) in a horizontal direction, and the third camera component 23 and the fourth camera component 24 are respectively arranged at two opposite sides of the X-ray tube 20 in the vertical direction. Therefore, the first camera component 21 photographs the imaging target to obtain a 3D image of the imaging target viewed from one side of the X-ray tube 20 in the horizontal direction, and the second camera component 22 photographs the imaging target to obtain a 3D image of the imaging target viewed from the side opposite the first camera component 21 in the horizontal direction of the X-ray tube 20. The third camera component 23 photographs the imaging target to obtain a 3D image of the imaging target viewed from one side of the X-ray tube 20 in the vertical direction. The fourth camera component 24 photographs the imaging target to obtain a 3D image of the imaging target viewed from the side opposite the third camera component 23 in the vertical direction of the X-ray tube 20.

Typical arrangements in which the number of camera components is 2, 3, or 4 have been described specifically above. Those skilled in the art will realize that such descriptions are provided by way of example and are demonstrative, and are not intended to limit the scope of protection of embodiments of the present disclosure. For example, the number of camera components may be more, the arrangement positions of the camera components may change (for example, some or all of the camera components being arranged on a beam limiter housing), etc.

After each camera component has acquired a respective 3D image, the respective 3D images may be sent via a wired interface or a wireless interface to a controller that performs the procedure as described above with respect to FIG. 2. In an embodiment, a wired interface comprises at least one of the following: a universal serial bus interface, a controller local area network interface or serial port, etc. In an embodiment, a wireless interface comprises at least one of the following: an infrared interface, a near field communication interface, a Bluetooth interface, a Zigbee interface, a wireless broadband interface, etc.

Block 202: generating a virtual 3D image on the basis of N 3D images, wherein a camera coordinate system of the virtual 3D image takes an X-ray source as the origin.

Here, the controller, on the basis of the N 3D images obtained by photography by the N camera components having respective photographing angles of view, generates the virtual 3D image in the camera coordinate system which takes the X-ray source as the origin. The virtual 3D image may be viewed as a 3D image obtained by photographing the imaging target by a virtual camera component virtually arranged at the X-ray source. In an embodiment, the direction of the optical axis in the camera coordinate system of the virtual 3D image is the same as the direction of the X-rays of the X-ray tube, and the XY plane in the camera coordinate system of the virtual 3D image is the same as an XY plane in X-ray imaging processing.

In one embodiment, block 202 may comprise: respectively converting N 3D images into point-cloud images in respective camera coordinate systems to obtain N point-cloud images; and fusing the N point-cloud images into a point-cloud image representing a virtual 3D image in a camera coordinate system which takes an X-ray source as the origin. In the point-cloud image fusing process, merging processing is performed on homologous points between the 3D images, and merging processing is not performed on non-homologous points. For example, a homologous point of a 3D image may be randomly selected to serve as a fusion result of the 3D images that have the homologous point. Alternatively, an average value of a homologous point in each 3D image may be calculated to serve as a fusion result of the 3D images that have the homologous point.

Block 203: converting the virtual 3D image into a 2D image.

In one embodiment, converting the virtual 3D image into a 2D image in block 203 comprises: on the basis of a human-machine interface, receiving a set (e.g. predetermined) instruction including a focal distance value and a resolution value; obtaining the focal distance value and the resolution value from the set instruction by parsing; and mapping a point-cloud image of the virtual 3D image into a 2D image on the basis of the focal distance value and the resolution value. In an embodiment, on the basis of a focal distance value and a resolution value, a coordinate system conversion algorithm may be used (for example, methods such as homogeneous coordinate conversion, coordinate translation, and coordinate rotation), to map the virtual 3D image to a 2D image.

Block 204: presenting the 2D image.

Here, the 2D image may be presented in a display medium. In various embodiments, the display medium may comprise an electronic display screen, air, a projector screen, etc. The electronic display screen may comprise various types, such as CRT, LCD, or LED.

In one embodiment, the method 200 further comprises: receiving an X-ray imaging region; determining a coordinate range of the virtual 3D image corresponding to the X-ray imaging region; on the basis of the coordinate range, determining a first accentuation region for accentuating the X-ray imaging region in the 2D image; and presenting the first accentuation region in the 2D image. Therefore, in the 2D image of the camera coordinate system which takes the X-ray source as the origin, since the problem of mismatch between the image and the default coordinate system of an algorithm is overcome, the defect of distortion of the first accentuation region is overcome.

In one embodiment, the method 200 further comprises: determining an automatic exposure region on the basis of a detector type; determining a coordinate range of the virtual 3D image corresponding to the automatic exposure region; on the basis of the coordinate range, determining a second accentuation region for accentuating the automatic exposure region in the 2D image; and presenting the second accentuation region in the 2D image. Therefore, in the 2D image of the camera coordinate system which takes the X-ray source as the origin, since the defect of mismatch between the image and the default coordinate system of an algorithm is overcome, the defect of distortion of the second accentuation region is overcome.

Figure 4:
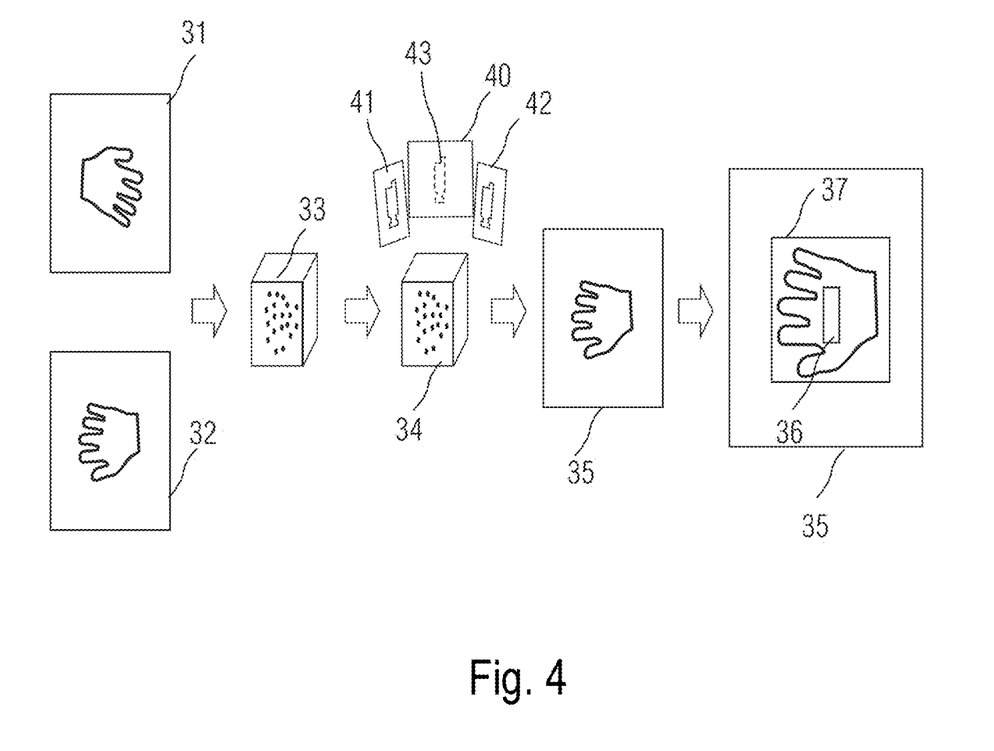
FIG. 4 illustrates a schematic diagram of an example demonstrative process for presenting a target in X-ray imaging according to one or more embodiments of the present disclosure.

FIG. 4 illustrates a schematic diagram of an example demonstrative process for presenting a target in X-ray imaging according to one or more embodiments of the present disclosure.

In FIG. 4, the first camera component 41 and the second camera component 42 are respectively arranged at two opposite sides of the housing of the X-ray tube 40. The first camera component 41 and the second camera component 42 respectively photograph an imaging target, which specifically is a hand, to obtain a first 3D image 31 and a second 3D image 32. In the camera coordinate system of the first 3D image 31, the optical center of the first camera component 41 is the origin of the coordinates, and in the camera coordinate system of the second 3D image 32, the optical center of the second camera component 42 is the origin of the coordinates.

In first point-cloud conversion processing 33, the first 3D image 31 is converted into a first point-cloud image, and the second 3D image 32 is converted into a second point-cloud image.

In the second point-cloud conversion processing 34, the first point-cloud image and the second point-cloud image are fused into a third point-cloud image. In a camera coordinate system of the third point-cloud image, the X-ray source is taken as the origin. That is, the third point-cloud image may be viewed as a point-cloud image of the imaging target photographed by the virtual camera component 43, wherein the optical center of the virtual camera component 43 coincides with the X-ray source. The third point-cloud image fuses the first point-cloud image and the second point-cloud image, and therefore the third point-cloud image has a better field of view compared to the first point-cloud image and the second point-cloud image.

On the basis of a focal length value and a resolution value provided by a user, the third point-cloud image is converted into the 2D image 35 including the hand. Next, an imaging region demarcating algorithm is used to demarcate the first accentuation region 37 for accentuating the imaging region in the 2D image 35, and an automatic exposure region demarcating algorithm is used to demarcate a second accentuation region 36 for accentuating the automatic exposure region in the 2D image 35. It can be seen that the first accentuation region 37 and the second accentuation region 36 are both rectangles, and distortion such as warping or deformation is not present.

Embodiments of the present disclosure further propose a system for presenting a target in X-ray imaging. The system comprises: N camera components, which are used for acquiring N 3D images of an imaging target, wherein each 3D image is provided with a respective camera coordinate system, and N is a positive integer greater than or equal to 2; and a control module, which is used for generating a virtual 3D image on the basis of the N 3D images, wherein a camera coordinate system of the virtual 3D image takes an X-ray source as the origin; converting the virtual 3D image into a 2D image; and presenting the 2D image. The control module may be implemented as a control computer integrated in an X-ray imaging system, or may be implemented as a control unit that is independent of a control computer. In an embodiment, the N camera components are arranged at respective mounting positions on the X-ray generating component so that 3D images having different fields of view may be provided.

Figure 5:
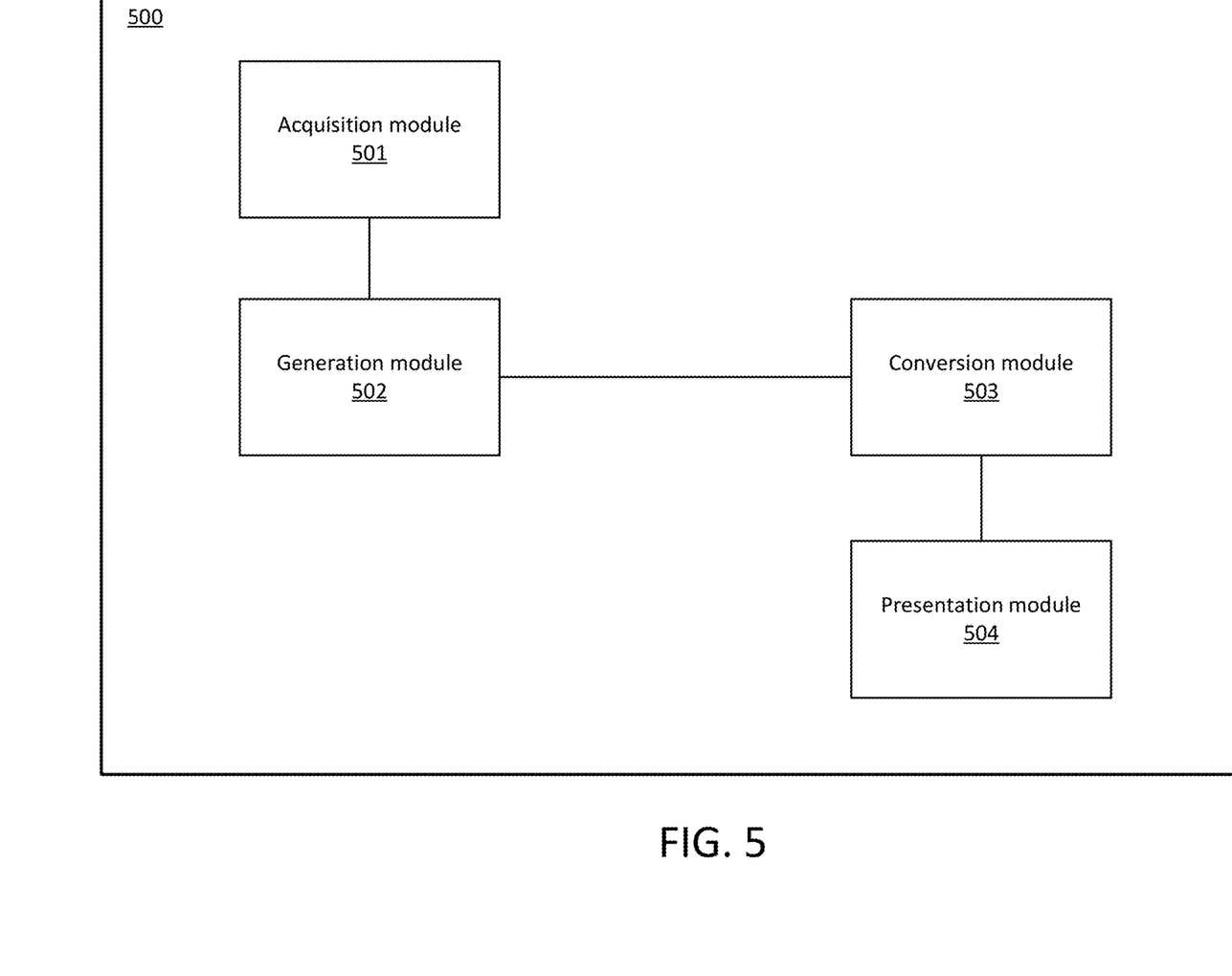
FIG. 5 illustrates a structural diagram of an example apparatus for presenting a target in X-ray imaging according to one or more embodiments of the present disclosure.

FIG. 5 is a structural diagram of an apparatus for presenting a target in X-ray imaging according to embodiments of the present disclosure. As shown in FIG. 5, an apparatus 500 for presenting a target in X-ray imaging is shown. The apparatus 500 may comprise a control computer as discussed herein, which may be alternatively be referred to as a controller. Alternatively, the apparatus 500 may be implemented as any suitable type of computing component that may perform the various methods as discussed herein. Any suitable number of the modules as shown in FIG. 5 may comprise part of such a control computer. The apparatus 500 comprises:

an acquisition module 501 (also referred to herein as acquisition circuitry or an image acquirer), which is used for acquiring N 3D images of an imaging target, wherein each 3D image is provided with a respective camera coordinate system, and N is a positive integer greater than or equal to 2; a generation module 502 (also referred to herein as generation circuitry or a virtual 3D image generator), which is used for generating a virtual 3D image on the basis of the N 3D images, wherein a camera coordinate system of the virtual 3D image takes an X-ray source as the origin; a conversion module 503 (also referred to herein as conversion circuitry or an image converter), which is used for converting the virtual 3D image into a 2D image; and a presentation module 504 (also referred to herein as presentation circuitry, an image presenter, or a display), which is used for presenting the 2D image.

In a demonstrative embodiment, the presentation module 504 is used for receiving an X-ray imaging region; determining a coordinate range of the virtual 3D image corresponding to the X-ray imaging region; on the basis of the coordinate range, determining a first accentuation region for accentuating the X-ray imaging region in the 2D image; and presenting the first accentuation region in the 2D image.

In a demonstrative embodiment, the presentation module 504 is used for determining an automatic exposure region on the basis of a detector type; determining a coordinate range, of the virtual 3D image, corresponding to the automatic exposure region; on the basis of the coordinate range, determining a second accentuation region for accentuating the automatic exposure region in the 2D image; and presenting the second accentuation region in the 2D image.

In a demonstrative embodiment, the generation module 502 is used for respectively converting the N 3D images into point-cloud images in respective camera coordinate systems to obtain N point-cloud images; and fusing the N point-cloud images into a point-cloud image representing the virtual 3D image in the camera coordinate system which takes the X-ray source as the origin.

In a demonstrative embodiment, the conversion module 503 is used for receiving a set instruction including a focal length value and a resolution value; obtaining the focal length value and the resolution value from the set instruction by parsing; and on the basis of the focal length value and the resolution value, mapping a point-cloud image of the virtual 3D image into a 2D image.

Figure 6:
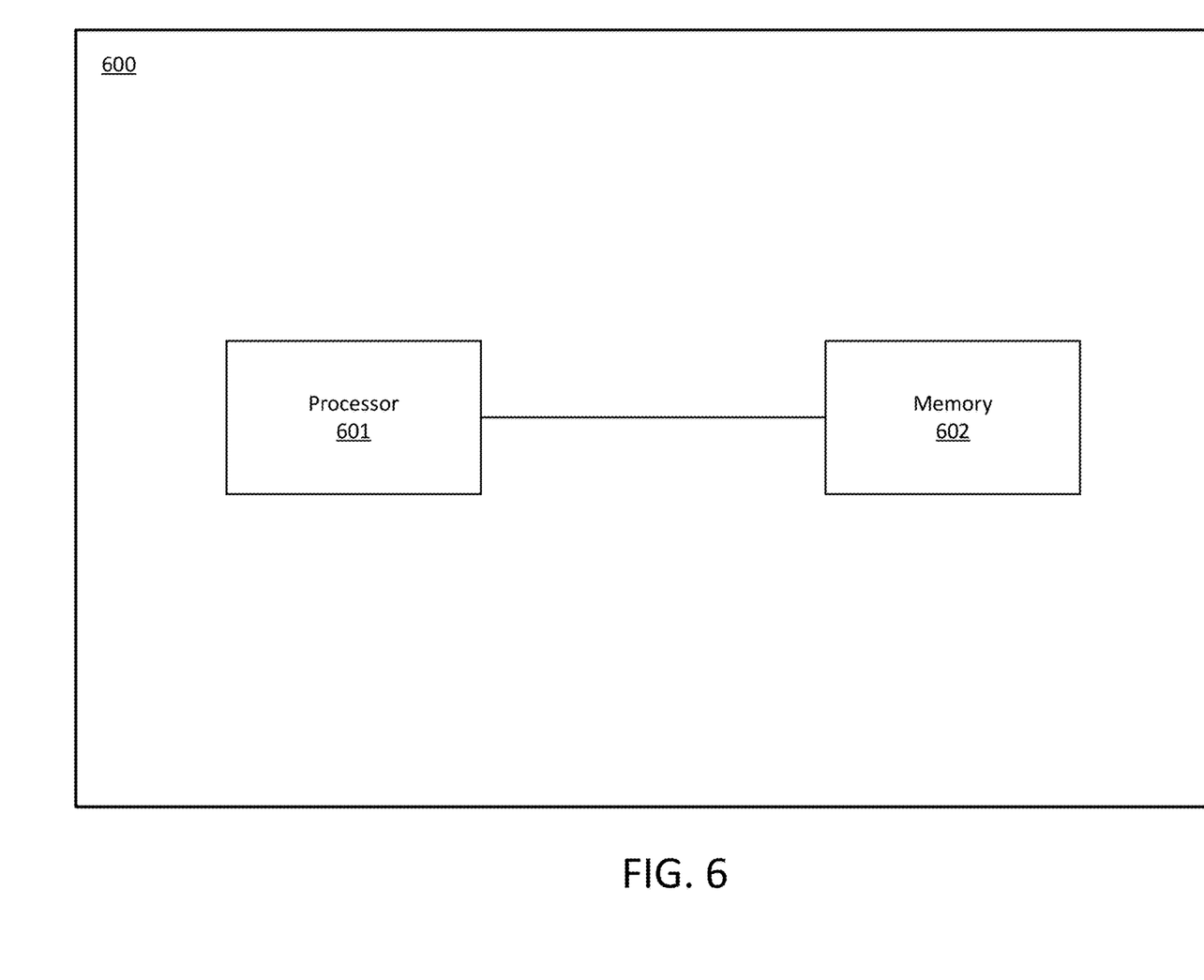
FIG. 6 illustrates a structural diagram of an example apparatus having a memory-processor architecture for presenting a target in X-ray imaging according to one or more embodiments of the present disclosure.

FIG. 6 is a structural diagram of an apparatus having a memory-processor architecture for presenting a target in X-ray imaging according to embodiments of the present disclosure.

As shown in FIG. 6, the apparatus 600 for presenting a target in X-ray imaging comprises a processor 601, a memory 602, and a computer program that is stored on the memory 602 and capable of being executed on the processor 601; when executed by the processor 601, the computer program implements the method for presenting a target in X-ray imaging according to any one of the embodiments above. The memory 602 may be implemented as any suitable type of storage media, such as an electrically erasable programmable read-only memory (EEPROM), a flash memory or a programmable read-only memory (PROM). The processor 601 may be implemented as comprising processing circuitry, one or more central processors, or one or more field-programmable gate arrays, wherein the field-programmable gate array integrates the one or more central processor cores. Specifically, the central processor or central processor core may be implemented as a central processing unit (CPU), a microcontroller (MCU), a digital signal processor (DSP), etc.

It is noted that not all of the blocks and modules in the flows and structural diagrams above are necessary; certain blocks or modules may be omitted according to actual requirements. The sequence in which the blocks are executed is not fixed, but may be adjusted as needed. The partitioning of the modules is merely functional partitioning, employed for the purpose of facilitating description; during actual implementation, one module may be realized by multiple modules, and the functions of multiple modules may be realized by the same module; these modules may be located in the same device, or in different devices.

Hardware modules in the embodiments may be realized mechanically or electronically. For example, one hardware module may comprise a specially designed permanent circuit or logic device (such as a dedicated processor, such as an FPGA or ASIC) for completing a specific operation. The hardware module may also comprise a programmable logic device or circuit that is temporarily configured by software (e.g. comprising a general processor or another programmable processor) for executing a specific operation. The choice of whether to specifically use a mechanical method, or a dedicated permanent circuit, or a temporarily configured circuit (e.g. configured by software) to realize the hardware module can be decided according to considerations of cost and time.

The present disclosure also provides a machine-readable storage medium, in which is stored an instruction for causing a machine to execute the method described herein. Specifically, a system or apparatus equipped with a storage medium may be provided; software program code realizing the function of any one of the embodiments above is stored on the storage medium, and a computer (or CPU or microprocessor (MPU)) of the system or apparatus is caused to read and execute the program code stored in the storage medium. Furthermore, it is also possible to cause an operating system etc. operating on a computer to complete a portion of, or all, actual operations by means of an instruction based on program code. It is also possible for program code read out from the storage medium to be written into a memory installed in an expansion board inserted in the computer, or written into a memory installed in an expansion unit connected to the computer, and thereafter instructions based on the program code cause a CPU etc. installed on the expansion board or expansion unit to execute a portion of and all actual operations, so as to realize the function of any one of the embodiments above. Embodiments of storage media used for providing program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROM. Optionally, program code may be downloaded from a server computer or a cloud via a communication network.

The embodiments above are merely preferred embodiments of the present disclosure, which are not intended to limit the scope of protection of the present disclosure. Any amendments, equivalent substitutions or improvements etc. made within the spirit and principles of the present disclosure shall be included in the scope of protection thereof.

The solutions of the present disclosure are described herein in terms of a number of representative embodiments to make the description concise and intuitive. The large number of details in the embodiments are intended to assist with understanding of the solutions of the present disclosure. However, the technical solutions of the present disclosure need not be limited to these details when implemented. To avoid making the solutions of the present disclosure unnecessarily obscure, some embodiments are not described meticulously, but merely outlined. Herein, "comprises" means "including but not limited to", while "according to . . ." means "at least according to . . . , but not limited to only according to . . . ". In cases where the quantity of a component is not specified herein, this means that there may be one or more of the component; this may also be interpreted as meaning at least one.

The various components described herein may be referred to as "units," or "modules." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or modules, as applicable and relevant, may alternatively be referred to herein as "circuitry," "controllers," "processors," or "processing circuitry," or alternatively as noted herein.

What is claimed is:

1. A method for presenting a target in X-ray imaging, comprising:
    acquiring a number of three-dimensional (3D) images, greater than or equal to 2, of an imaging target, each one of the 3D images having a respective camera coordinate system;
    generating a virtual 3D image based upon the 3D images by:
        converting the 3D images into respective point-cloud images having respective camera coordinate systems to obtain a number of point-cloud images; and
        fusing the point-cloud images into a single point-cloud image representing the virtual 3D image in a camera coordinate system that uses an X-ray source as an origin;
    converting the virtual 3D image into a two-dimensional (2D) image by:
        receiving a predetermined instruction indicating a focal length value and a resolution value;
        parsing, from the predetermined instruction, the focal length value and the resolution value to thereby obtain the focal length value and the resolution value; and
        mapping, based upon the focal length value and the resolution value, the single point-cloud image to the 2D image; and
    presenting the 2D image.

2. The method as claimed in claim 1, further comprising:
    receiving an X-ray imaging region;
    determining a coordinate range of the virtual 3D image corresponding to the X-ray imaging region;
    determining, based upon the coordinate range, a first accentuation region for accentuating the X-ray imaging region in the 2D image; and
    presenting the first accentuation region in the 2D image.

3. The method as claimed in claim 1, further comprising:
    determining an automatic exposure region based upon a detector type;
    determining a coordinate range of the virtual 3D image corresponding to the automatic exposure region;
    determining, based upon the coordinate range, a second accentuation region for accentuating the automatic exposure region in the 2D image; and
    presenting the second accentuation region in the 2D image.

4. An apparatus for presenting a target in X-ray imaging, comprising:
    an image acquirer configured to acquire a number of three-dimensional (3D) images, greater than or equal to 2, of an imaging target, each one of the 3D images having a respective camera coordinate system;
    an image generator configured to generate a virtual 3D image based upon the 3D images by:
        converting the 3D images into respective point-cloud images having respective camera coordinate systems to obtain a number of point-cloud images; and
        fusing the point-cloud images into a single point-cloud image representing the virtual 3D image in a camera coordinate system that uses an X-ray source as an origin;
    an image converter configured to convert the virtual 3D image into a two-dimensional (2D) image by:
        receiving a predetermined instruction indicating a focal length value and a resolution value;
        parsing, from the predetermined instruction, the focal length value and the resolution value to thereby obtain the focal length value and the resolution value; and
        mapping, based upon the focal length value and the resolution value, the single point-cloud image to the 2D image; and
    an image presenter configured to present the 2D image.

5. The apparatus as claimed in claim 4, wherein the image presenter is configured to:
    receive an X-ray imaging region;

determine a coordinate range of the virtual 3D image corresponding to the X-ray imaging region;
determine, based upon the coordinate range, a first accentuation region for accentuating the X-ray imaging region in the 2D image; and
present the first accentuation region in the 2D image.

6. The apparatus as claimed in claim 4, wherein the image presenter is configured to:
determine an automatic exposure region based upon a detector type;
determine a coordinate range of the virtual 3D image corresponding to the automatic exposure region;
determine, based upon the coordinate range, a second accentuation region for accentuating the automatic exposure region in the 2D image; and
present the second accentuation region in the 2D image.

7. A system for presenting a target in X-ray imaging, comprising:
a number of cameras, each one of the cameras being configured to acquire a respective 3D image of an imaging target to provide a number of three-dimensional (3D) images, greater than or equal to 2, of the imaging target,
wherein each one of the 3D images has a respective camera coordinate system; and
controller configured to:
generate a virtual 3D image based upon the 3D images by:
converting the 3D images into respective point-cloud images having respective camera coordinate systems to obtain a number of point-cloud images; and
fusing the point-cloud images into a single point-cloud image representing the virtual 3D image in a camera coordinate system that uses an X-ray source as an origin;
convert the virtual 3D image into a two-dimensional (2D) image by:
receiving a predetermined instruction indicating a focal length value and a resolution value;
parsing, from the predetermined instruction, the focal length value and the resolution value to thereby obtain the focal length value and the resolution value; and
mapping, based upon the focal length value and the resolution value, the single point-cloud image to the 2D image; and
present the 2D image.

8. The system as claimed in claim 7, wherein the cameras are arranged at respective mounting positions on an X-ray generating component.

9. A non-transitory computer-readable storage medium having instruction stored thereon that, when executed by an apparatus for presenting a target in X-ray imaging, cause the apparatus to:
acquire a number of three-dimensional (3D) images, greater than or equal to 2, of an imaging target, each one of the 3D images having a respective camera coordinate system;
generate a virtual 3D image based upon the 3D images by:
converting the 3D images into respective point-cloud images having respective camera coordinate systems to obtain a number of point-cloud images; and
fusing the point-cloud images into a single point-cloud image representing the virtual 3D image in a camera coordinate system that uses an X-ray source as an origin,
wherein a camera coordinate system of the virtual 3D image uses an X-ray source as an origin;
convert the virtual 3D image into a three-dimensional (2D) image by:
receiving a predetermined instruction indicating a focal length value and a resolution value;
parsing, from the predetermined instruction, the focal length value and the resolution value to thereby obtain the focal length value and the resolution value; and
mapping, based upon the focal length value and the resolution value, the single point-cloud image to the 2D image; and
present the 2D image.

\* \* \* \* \*